US010045092B2

(12) United States Patent
Deuel et al.

(10) Patent No.: US 10,045,092 B2
(45) Date of Patent: Aug. 7, 2018

(54) DEVICE-RESIDENT CONTENT PROTECTION

(71) Applicant: Disney Enterprises, Inc., Burbank, CA (US)

(72) Inventors: Matthew Deuel, Playa Vista, CA (US); Leon Silverman, Encinco, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/885,834

(22) Filed: Oct. 16, 2015

(65) Prior Publication Data
US 2017/0111711 A1   Apr. 20, 2017

(51) Int. Cl.
*H04N 21/254*   (2011.01)
*H04N 21/8358*   (2011.01)

(52) U.S. Cl.
CPC ..... *H04N 21/8358* (2013.01); *H04N 21/2541* (2013.01)

(58) Field of Classification Search
CPC ............... G06F 21/10; G06F 17/30784; G06F 2221/0737; H04N 21/4353; H04N 21/44008; H04N 21/4405; H04N 21/8133; H04N 21/835; H04N 21/8358; H04N 5/913; H04N 7/1675; H04N 21/2347; H04N 21/235; H04N 21/2351; H04N 21/2541; H04N 21/41415
See application file for complete search history.

(56) References Cited

U.S. PATENT DOCUMENTS

| | | |
|---|---|---|
| 6,427,020 B1 | 7/2002 | Rhoads |
| 6,700,989 B1 | 3/2004 | Itoh et al. |
| 7,366,322 B2 | 4/2008 | Kacker et al. |
| 7,613,735 B2 | 11/2009 | Yao |
| 7,631,336 B2 | 12/2009 | Diaz Perez |

(Continued)

FOREIGN PATENT DOCUMENTS

CN   103414918 A   12/2013

OTHER PUBLICATIONS

Irdeto Piracy Control, An end-to-end suite of services for brand and revenue protection, http://irdeto.com/documents/Collateral/so_piracy_control_en_pdf, Last modification: Jul. 1, 2015 / 10:00AM GMT, pp. 1-5.

(Continued)

*Primary Examiner* — Hai V Tran
(74) *Attorney, Agent, or Firm* — Sheppard Mullin Richter & Hampton LLP

(57) ABSTRACT

Systems and methods are provided for enforcing the consumption and broadcasting of protected content. A user device on which protected content may be captured, consumed and/or broadcast to other user devices, identifies content being consumed and/or broadcast. Upon identifying the content, the content is determined as being protected or unprotected. If the content is deemed to be protected, the user device can cease consumption of the content on the user device as well as to the other user devices to which the content is being broadcast. Additionally, the user device can transmit a warning notification to one or more of the user device and the other user devices. Further still, the user device can present options to legitimize the presentation of the content on the user device and/or the other user devices.

17 Claims, 5 Drawing Sheets

(56) References Cited

U.S. PATENT DOCUMENTS

| | | | |
|---|---|---|---|
| 7,707,614 B2 | 4/2010 | Krikorian et al. | |
| 8,037,506 B2 | 10/2011 | Cooper et al. | |
| 8,250,660 B2 | 8/2012 | Levy et al. | |
| 8,571,993 B2 | 10/2013 | Kocher et al. | |
| 8,650,128 B2 | 2/2014 | Levy et al. | |
| 8,752,099 B2 * | 6/2014 | Riedl | H04N 5/913 725/1 |
| 8,775,317 B2 | 7/2014 | Schmelzer | |
| 8,818,021 B2 | 8/2014 | Brubeck et al. | |
| 8,923,548 B2 | 12/2014 | Petrovic et al. | |
| 8,966,571 B2 | 2/2015 | Granstrom | |
| 9,380,225 B2 | 6/2016 | Tiscareno et al. | |
| 2004/0243634 A1 * | 12/2004 | Levy | G06F 21/10 |
| 2005/0278760 A1 | 12/2005 | Dewar et al. | |
| 2008/0082448 A1 * | 4/2008 | Meijer | G06F 21/10 705/14.69 |
| 2009/0158443 A1 | 6/2009 | Dias et al. | |
| 2009/0316890 A1 * | 12/2009 | Schultz | H04N 21/2347 380/203 |
| 2011/0289114 A1 * | 11/2011 | Yu | G06F 17/30784 707/769 |
| 2012/0095749 A1 * | 4/2012 | Capretta | H04H 20/63 704/8 |
| 2012/0128330 A1 | 5/2012 | Mahdavi et al. | |
| 2012/0255029 A1 | 10/2012 | Kim et al. | |
| 2012/0262576 A1 | 10/2012 | Sechrist et al. | |
| 2013/0007890 A1 | 1/2013 | De Laat et al. | |
| 2013/0263207 A1 * | 10/2013 | Granstrom | G06F 21/10 726/1 |
| 2013/0344916 A1 * | 12/2013 | Rodriguez | H04M 1/0272 455/556.1 |
| 2014/0325550 A1 | 10/2014 | Winograd et al. | |
| 2014/0351871 A1 | 11/2014 | Bomfim et al. | |
| 2015/0121534 A1 | 4/2015 | Zhao et al. | |

OTHER PUBLICATIONS

Netnames Anti-Piracy, Digital Piracy Protection, http://www.netnames.com/services/online-brand-protection/digital-piracy-protection, accessed on Jul. 6, 2015, pp. 1-6.

Platform Team, Nexguard Launches Live Detection to Identify and Stop the Illegal Re-Distribution of Live Sports Broadcast and OTT Services, http://www.plaffornpr.com/nexguard-launches-live-detection-to-identify-and-stop-the-illegal-re-distribution-of-live-sports-broadcast-and-ott-services/, accessed on Jul. 8, 2015, pp. 1-3.

Civolution, Audio and video content identification solutions for applications in the public sector, defense industry and law enforcement organizations, http://www.civolution.com/wp-content/uploads/2014/02/Civolution-introduction-AV-content-identification-defense-and-law-enforcement-Feb2014-.pdf, Feb. 2014, pp. 1-22.

WP101, 10 Reasons Why You Should Never Host Your Own Videos, https://www.wp101.com/10-reasons-why-you-should-never-host-your-own-videos/, accessed on Jul. 6, 2015, pp. 1-50.

Shaghaghi et al., An SDN-based Framework for Detection of Illegal Rebroadcasting of Channels in P2PTV, http://conferences2.sigcomm.org/co-next/2014Workshops/VideoNext/VideoNEXT_papers/p47.pdf, Dec. 2, 2014, pp. 47-49, ACM, Sydney, Australia.

* cited by examiner

DEVICE-RESIDENT CONTENT PROTECTION

TECHNICAL FIELD

The present disclosure relates generally to protecting against unauthorized content broadcasting and distribution.

DESCRIPTION OF THE RELATED ART

Broadcasting can refer to the distribution of media content, such as audio, video, etc., to a dispersed audience via some mass communication medium. The mass communication medium may be a cable network, a data network, radio waves, and the like.

BRIEF SUMMARY OF THE DISCLOSURE

In accordance with one embodiment, a computer-implemented method, comprises detecting when content is being captured by a capturing component on a user device. Additionally, the computer-implemented method comprises determining, via the user device, whether the content is protected content. Upon a determination that the content is protected content, altering a presentation of the content on the user device.

In accordance with another embodiment, an apparatus comprises a processor and a memory having computer code configured to cause the processor to: identify content being captured via an input device implemented within the apparatus; determine whether the content is protected content; and upon a determination that the content is protected content, altering the presentation of the content on the apparatus.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Digital distribution can refer to the delivery of media content without the use of physical media, and has become popular due to advances in computer networking and communication technologies. The use of personal devices, such as smart phones, tablet personal computers (PCs), etc. to consume media content has also increased in popularity. The combination of these two technologies has resulted in a new form of broadcasting often referred to as livestreaming, which can involve a person using a camera on a mobile device to capture and/or record some event and broadcast that event, in real-time, over a social networking service, for example. Subscribers to the social networking service can then view the event. The broadcasting or distribution of the event can also be direct (peer-to-peer(s)). For example, broadcasting or distribution can also occur in the context of a conference call, a group text, sharing directly with one or multiple friends, sharing in a "virtual living room" environment via artificial or virtual reality, etc.

The use of applications to achieve this type of broadcasting, however, can result in abuses. Capturing and broadcasting content being displayed on a device to other users may bypass digital rights management (DRM) restrictions or other protections associated with the content. That is, consumers that have not purchased the rights to view protected content can nevertheless consume or otherwise experience that content. Conventional systems and methods merely institute content protection at the content source or at the provider-level or network-level and cannot protect against the above-described abuses.

Content in the present disclosure can be any type of media content, including but not limited to movies, broadcast TV shows, online videos, user-created videos/content, music, images, sports games, video games, and the like. Media content can also be a recording of any type of event or occurrence, the presentation of which is recorded for presentation in real-time or for later consumption. Moreover, the media content can be accessed or originate from one or more broadcast entities, media content servers, personal devices, etc. Protected content may be content having DRM access control restrictions, such as specially coded content files, content identified as being non-reproducible without the content-owner's consent, etc. Unprotected content may be content that is freely distributable and/or reproducible.

Figure 1:
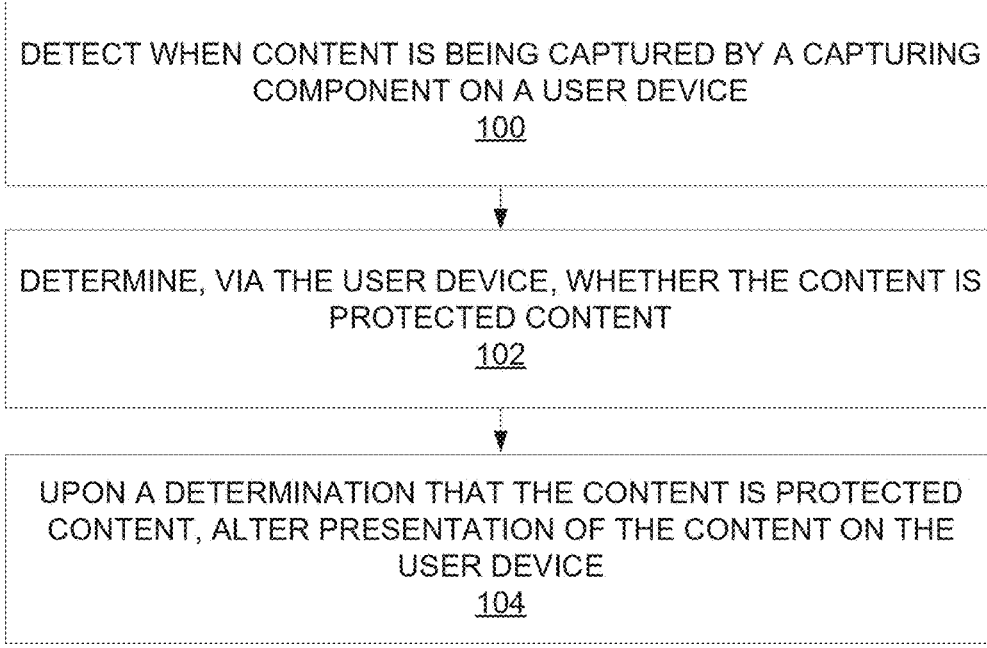
FIG. 1 is an operational flow diagram illustrating an example process for user device-resident control of protected content presentation in accordance with various embodiments.
Figure 2:
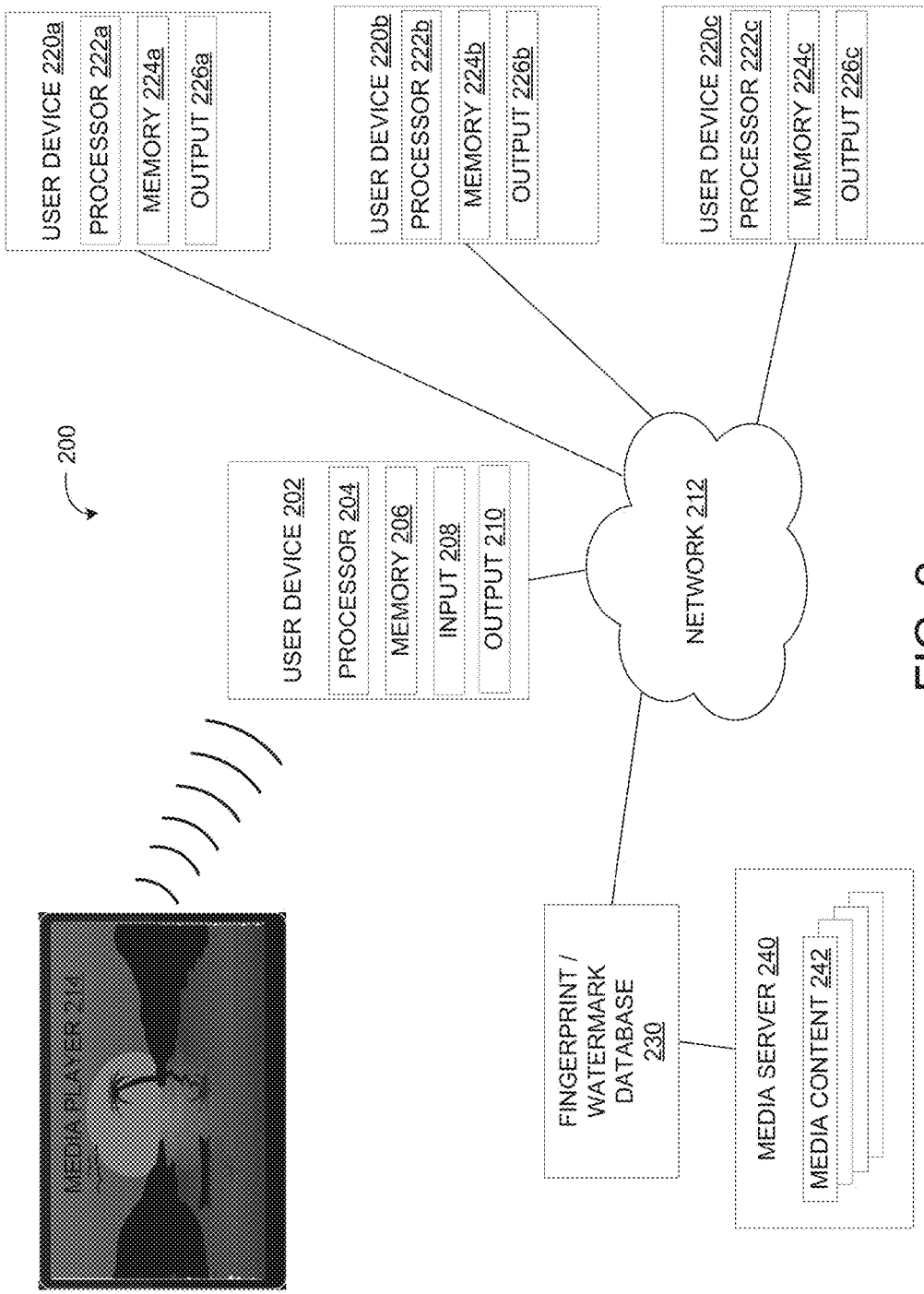
FIG. 2 illustrates an example content presentation and broadcast system with which various embodiments may be implemented.

Various embodiments of the present disclosure provide a mechanism for content protection at the user device-level (where content is being captured, recorded and/or broadcasted/presented). This user device is able to enforce content protection in situations when conventional measures fail because the various embodiments may not rely upon DRM technologies associated with a content file. FIG. 1 illustrates an example process that can be performed for controlling the consumption and/or broadcasting of protected content, and will be described in conjunction with FIG. 2, which illustrates an example environment in which various embodiments may be implemented.

As illustrated in the flow chart of FIG. 1, a user device detects when content is being captured by a capturing component (such as a camera) on the user device at operation 100. For example, and referring to FIG. 2, user device 202 may be any user device, such as a smart phone, tablet PC, laptop PC, or some alternative form of media accessing or presentation device. The input device 208 of user device 202 may be a camera, audio recorder, etc. The output device 210 of user device 202 may be a display, audio speakers, etc. When input device 208 is activated (for livestreaming applications to perform a broadcast) some predetermined amount or length of audio and/or video can be captured by user device 202. For example, an outbound audio pulse can be transmitted upon activation of input device 208 as a trigger, and a six-second clip of the content can be captured by user device 202.

Regarding the broadcasting aspect of system 200, processor 204 can instruct user device 202 to transmit content captured by user device 202 to one or more other users for presentation on user devices 220a-220c. This can occur via streaming over a network, such as network 212, for example. Network 212 may be any cable, wire, and/or wireless communications network such as a cellular or data network, a satellite network, an intranet, an extranet, a virtual private network (VPN), a local area network (LAN), a wireless LAN (WLAN), a wide area network (WAN), a personal area network (PAN), a portion of the Internet, a portion of the Public Switched Telephone Network (PSTN), Bluetooth or any combination thereof. Each of the user devices 220a-220c may have their own respective processors 222a-222c, memories 224a-224c, and output devices 226a-226c through which the content broadcast by user device 202 can be consumed. In one embodiment, the user device 202 may transmit content directly to the other user devices 220a-220c without a network 212.

Memory 206 of user device 202 can store a livestreaming application for allowing input device 208 to capture and/or record media content, for example, media content being presented on media player 214, which can be a monitor, TV, network connected device, etc., and broadcast the content by user device 202. Memory 206 can also be used to store the portion(s) of the content being played back and/or broadcast read into user device 202 by input device 208.

User device 202 may then access a fingerprint/watermark database 230 via network 212. Fingerprint/watermark database 230 may be populated with various fingerprints that can be used to uniquely identify content. A fingerprint can be some portion or section of content representative of that content, and therefore, can be used to identify the content item. For example a fingerprint of a movie can be an audio and/or visual clip of that movie, e.g., a particular piece of dialogue spoken in the movie. Other aspects of the content may be used as a fingerprint, such as a portion of the soundtrack, some visual aspect of a scene, etc. As will be described below, fingerprint/watermark database 230 may also be populated with known watermarks such as an audio or visual marker embedded in the content that can be used to identify the content.

In the above example, fingerprint/watermark database 230 may store audio and/or visual clips of movies, which can be compared with captured, recorded or presented content to identify the content. In some embodiments, the comparison can be performed at user device 202, while in other embodiments, user device 202 may transmit the captured clip of the content to fingerprint/watermark database 230 for the comparison to be performed. Fingerprint/watermark database 230 can be a single database maintained by a content provider, or a content creator, such as a production studio or a $3^{rd}$ party providing copyright protection services. Alternatively, user device 202 can access a plurality or network of fingerprint/watermark databases maintained by respective content providers.

Content providers, such as a movie studios, TV studios, cable providers, digital media content distributors, or other third-party distributors may maintain respective media servers, such as media server 240. Media server 240 may include a content database on which digital media content 242 and/or metadata associated with media content can be stored. Fingerprints of the media content 242 can be captured and used to populate fingerprint/watermark database 230. It should be understood that fingerprint/watermark database 230 can store large amounts of fingerprints for faster identification of the content.

In some embodiments, the content to be identified may be a live sporting event or performance. Identifying the live sporting event may include performing voice recognition with respect to sportscasters previously known to be covering the live sporting event, audio/visual clips of advertisements or commercials expected to be presented during the live sporting event, or known terms that are expected to be heard, such as "touchdown" for a football game. As another example, a live event, such as a musical production, can be identified by accessing fingerprint/watermark database 230, which can store the script of the musical production, allowing the musical production to be fingerprinted.

It should be noted that in addition to the aforementioned social networking service applications where content captured by input device 208 can be broadcast to other subscribers of the social networking service, content can also be captured and/or recorded by input device 208 and broadcast or distributed to user devices associated with contacts of the broadcasting user of user device 202. For example, user devices 220a-220c may be smart phones associated with telephone numbers stored in memory 206 of user device 202. Moreover, content can be broadcast directly to users via computing or communication platforms that allow content sharing.

It should be further noted that various embodiments of the technology disclosed in the present disclosure can also protect against a user capturing and consuming protected content on a user device, regardless of whether or not the protected content is being broadcast. That is, various embodiments can prevent a user of user device 202 from capturing and consuming content that is deemed to be protected content by virtue of fingerprinting content that is being output by output device 210. Hence, processor 204 could be configured to perform fingerprinting or monitoring of watermarks (discussed below) whenever output device 208 is activated or in accordance with certain pre-determined rules regarding when it might be prudent to check whether protected content may be consumed.

Referring back to FIG. 1, once the content is identified, it is determined via the user device, whether the content is protected content at operation 102. For example, fingerprint/watermark database 230 can be a database in which fingerprints associated with a particular content are also associated with a tag or other indication denoting the particular content as being protected or unprotected. In this way, content can be determined to be protected or unprotected simultaneously with the identification of the content. In other embodiments, a subsequent operation of accessing another database or the content provider, such as media server 240, can be performed in order to determine whether or not the identified content is protected.

In accordance with other embodiments, audio and/or visual watermarks can be inserted or embedded into the content during production or post-production. Such audio and/or visual watermarks can be made to be undiscernible (or at least substantially so) to a user consuming the content, but recognizable to user device 202 so that user device 202 can identify the content. For example, content can be associated with a particular, unique audio and/or visual watermark that identifies the content. In this case, upon recognizing the existence of a watermark in the content, user device 202 may access fingerprint/watermark database 230 in order to associate the watermark with a known content, thereby identifying the content as being that known content. In other embodiments, the audio and/or visual watermark can be a direct indication that the content is protected content. That is, the existence of a watermark is evidence that the content is protected content, and the absence of a watermark means that the content is unprotected.

There are different ways to insert a watermark into a video, and there are different ways to detect a watermark in a video. Some watermarks are inserted using a temporal method, which may use timecodes of the video as a reference.

Referring back to FIG. 1, upon determining that the content is protected content, the presentation of the content is altered on the user device at operation 104. For example, and as will be further described, the presentation of the content via output device 210 can be immediately halted, a warning notification can be presented via output device 210 indicating that presentation and/or broadcast will cease, and/or one or more options for converting the presentation and/or broadcast of the protected content into a legitimate presentation can be presented via output device 210.

In the event that the content is being broadcast, user device 202 may further determine this act of broadcasting is occurring, and can send the same notifications and/or options, as well as cease presentation of the content on user devices 220a-220c. For example, the livestreaming application resident in memory 206 can be accessed to determine subscribers that are receiving the broadcast content. Alternatively, the radio communications resources utilized by user device 202 can be queried to determine ongoing communications to identify to whom/what user devices are receiving broadcast content via a unique device ID, such as a device mobile station ID (MSID) or mobile identification number (MIN), mobile directory number (MDN), etc.

Instead of (or in addition to) user device 202 detecting the transmission of watermarked content to other user devices 220a-220c, the other user devices 220-220c themselves can detect that they are receiving watermarked content from user device 202, which is capturing the watermarked content with a camera. In this case, the other user devices 220a-220c may stop receiving watermarked content from user device 202 or generate a notification to the user or a server.

Figure 3A:
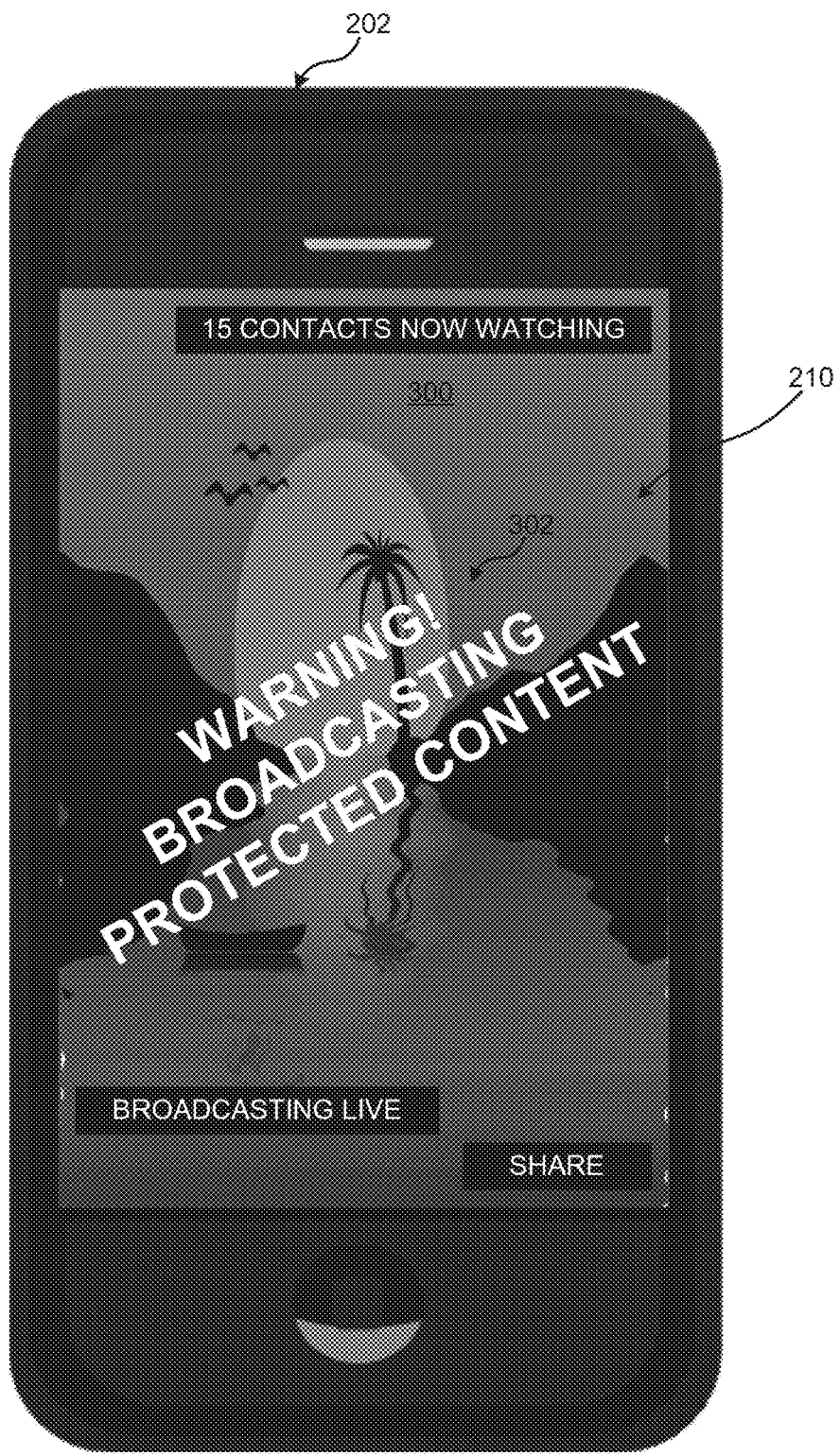
FIG. 3A illustrates an example user interface for controlling protected content presentation in accordance with various embodiments.

FIG. 3A illustrates an example graphical user interface (GUI) 300 that may be used to view and/or broadcast content on user device 202. GUI 300 may be overlaid on content being presented via output device 210, which in this example, is a display. GUI 300 indicates that the content being presented via output device 210 is being broadcast live, and that 15 contacts are watching the broadcast content. If, as described above, the broadcast content is deemed to be protected content, user device 202 may alter the presentation of the protected content. In the example illustrated here, a warning notification 302 is displayed on output device 210 indicating that the content being broadcast is protected content. As described above, playback of the protected content can cease within some predetermined period of time after which warning notification 302 was displayed. In other instances, the playback may simply cease immediately without any notification being displayed.

As also described above, the user devices 220a-220c to which the protected content is being broadcast can be determined, and the same (or similar) warning notification 302 can be displayed on their respective output devices. Although warning notification 302 is a visual warning in the illustrated example, an audio warning notification or some combination of an audio and visual warning notification can be presented to the user of user device 202 and/or the users of user devices 220a-220c. The manner in which the presentation of the protected content is altered can be based upon one or more particular business rules and/or protections associated with the protected content.

Figure 3B:
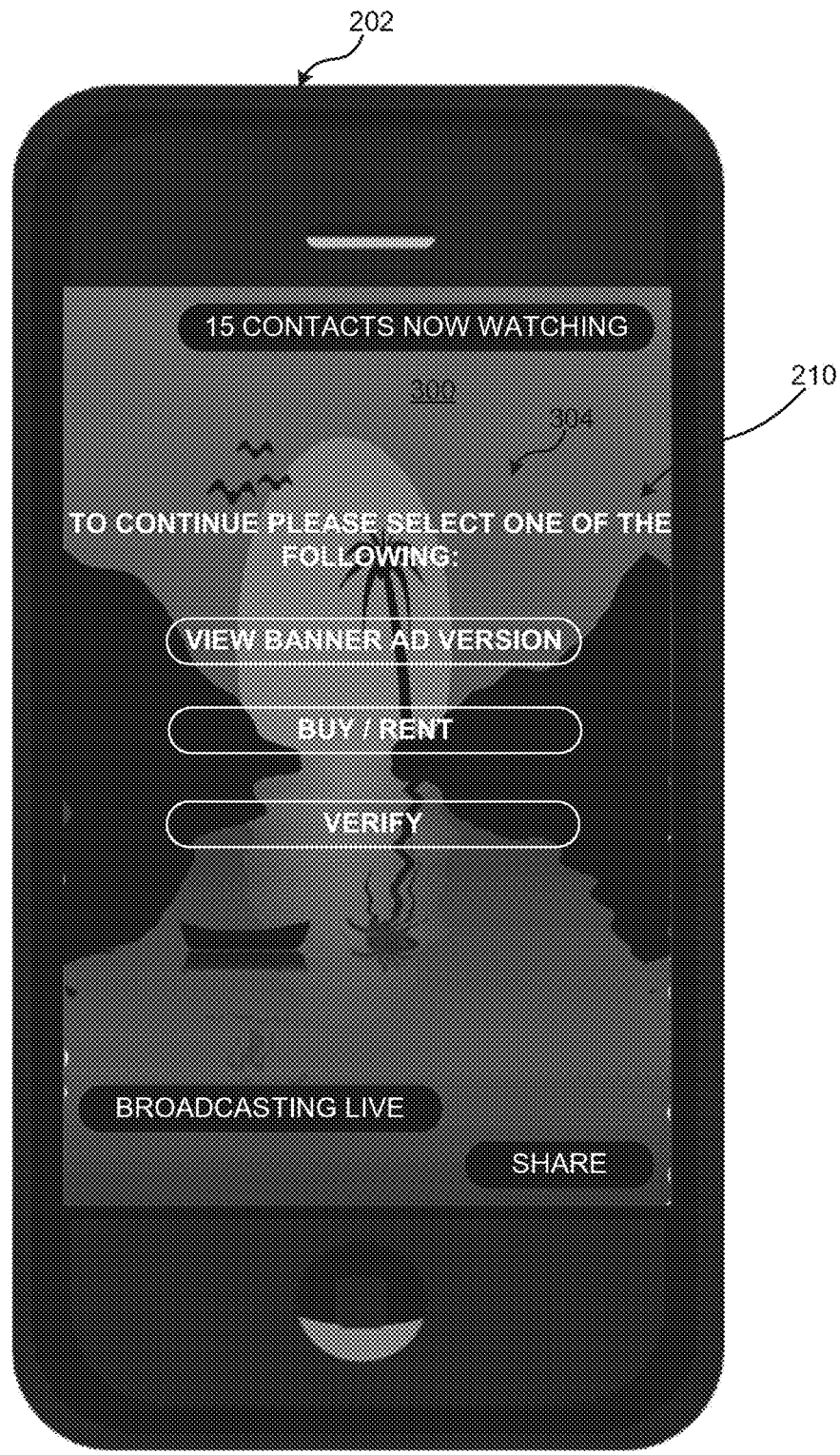
FIG. 3B illustrates an example user interface for legitimizing protected content presentation in accordance with various embodiments.

FIG. 3B illustrates example GUI 300, where one or more options for converting the presentation of protected content to a legitimate presentation can be presented to the user of user device 202. In this example, multiple options 304 are presented on output device 210, so that the user can continue to consume and/or broadcast the protected content. One of the options 304 is the choice to view an ad-supported version of the protected content. Another of the options 304 is the choice to buy or rent the protected content. Upon the user of user device 202 selecting either of the options 304, a new version of the protected content can be transmitted (downloaded or streamed, for example) to user device 202 from a content provider, such as media server 240. It should be noted that user device 202 can be directed to an appropriate transaction portal, website, application, or other digital retailer access point in some embodiments. In accordance with other embodiments, the GUI 300 can connect with the appropriate transaction portal, website, or application on the backend and allow for any transaction to occur directly through the GUI 300. Alternatively, as yet another of the options 304, user device 202 can communicate with the content provider to obtain or update/verify an entitlement or license that will allow the user to consume or continue consuming the protected content on user device 202 and/or broadcast the protected content therefrom. The purchase or rental of the protected content can be transacted via a transaction screen or interface of GUI 300, or user device 202 can be redirected to a content provider application or web browser or hot-linked purchase page without any input from the user.

It should be noted that the buy/rent option can be country-specific. For example, the user of user device 202 may be recording content, such as a movie that has been released in his/her country, but broadcasting that movie to other users of user devices 220a-220c who reside in a country in which the movie has not yet been released. In this case, the buy/rent option can be an option to pre-order the content.

As for the other users to which the protected content was being broadcast, the same (or similar) options 304 can be presented to allow their respective presentation of the protected content to continue. It should be noted that in some embodiments, the new version of the protected content or the obtained/updated entitlement or license for the protected content can apply to the other users of user devices 220a-220c in addition to the user of user device 202.

In addition to presenting notifications and/or options to legitimize the consumption and/or broadcasting of protected content, user device 202 can also transmit notifications to the content provider or owner of the protected content. For example, an email, text, or other type of notification can be sent to the content provider or owner informing them of the unauthorized use of their protected content. The type of information that may be included in such a notification can vary depending on users' privacy rights as well as the aforementioned business rules/DRM controls associated with the protected content. In some embodiments, information such as a telephone number or email address associated with user device 202 may be transmitted. In other embodiments, the notification may not contain any user identification information. But the user device 202 could notify the content owner of device information, such as what type of device is capturing content and broadcasting it. In still other embodiments, for example, in the context of user device 202 being used to broadcast a movie that is only in theatrical release, the location of user device 202 (which would generally coincide with the location of theater) can be sent with the notification.

Figure 4:
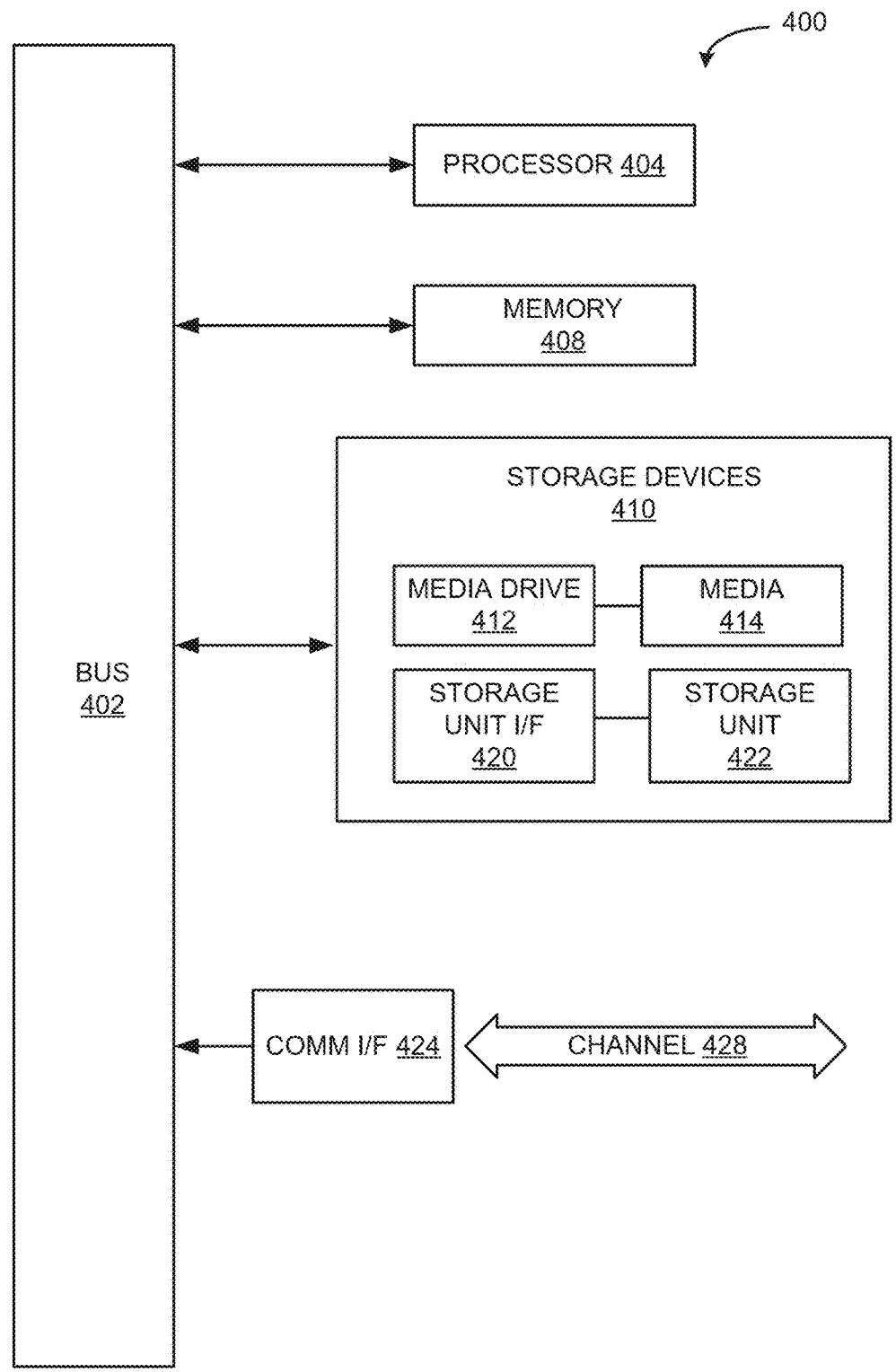
FIG. 4 is an example computing component that may be used to implement various features of embodiments described in the present disclosure.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components or components of the application are implemented in whole or in part using software, in one embodiment, these software elements can be implemented to operate with a computing or processing component capable of carrying out the functionality described with respect thereto. One such example computing component is shown in FIG. 4 which may be used to implement various features of the system and methods disclosed herein. Various embodiments are described in terms of this example-computing component 400. After reading this description, it will become apparent to a person skilled in the relevant art how to implement the application using other computing components or architectures.

Referring now to FIG. 4, computing component 400 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays (virtual and augmented reality); servers; or any other type of special-purpose or general-purpose computing devices as may be desirable or appropriate for a given application or environment. For example, computing component 400 may be one embodiment of user device 202 and/or one or more functional elements thereof. Computing component 400 might also represent computing capabilities embedded within or otherwise available to a given device. For example, a computing component might be found in other electronic devices such as, for example navigation systems, portable computing devices, and other electronic devices that might include some form of processing capability.

Computing component 400 might include, for example, one or more processors, controllers, control components, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of computing component 400 or to communicate externally.

Computing component 400 might also include one or more memory components, simply referred to herein as main memory 408. For example, preferably random access memory (RAM) or other dynamic memory might be used for storing information and instructions to be executed by processor 404. Main memory 408 might also be used for storing temporary variables or other intermediate information during execution of instructions to be executed by processor 404. Computing component 400 might likewise include a read only memory ("ROM") or other static storage device coupled to bus 402 for storing static information and instructions for processor 404.

The computing component 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 414 might include, for example, a hard disk, an integrated circuit assembly, magnetic tape, cartridge, optical disk, a CD or DVD, or other fixed or removable medium that is read by, written to or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing component 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory component) and memory slot, a PCMCIA slot and card, and other fixed or removable storage units 422 and interfaces 420 that allow software and data to be transferred from the storage unit 422 to computing component 400.

Computing component 400 might also include a communications interface 424. Communications interface 424 might be used to allow software and data to be transferred between computing component 400 and external devices. Examples of communications interface 424 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 424 might typically be carried on signals, which can be electronic, electromagnetic (which includes optical) or other signals capable of being exchanged by a given communications interface 424. These signals might be provided to communications interface 424 via a channel 428. This channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 408, storage unit 420, media 414, and channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 400 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method, comprising:
   detecting when content is being captured by a capturing component on a user device;
   determining, via the user device, whether the content is protected content; and
   upon a determination that the content is protected content, altering a presentation of the content on the user device, wherein the altering of the presentation does not rely on a digital rights management technique associated with the content, wherein altering the presentation comprises presenting at least one option to legitimize the presentation of the content, the at least one option comprising an option to have an ad-supported version of the content presented on or from the user device, an option to rent the content, and an option to pre-order the content, and wherein altering the presentation of the content from the user device comprises presenting at least one option on another user device to which the content is being broadcast to legitimize the presentation of the content.

2. The computer-implemented method of claim 1, wherein detecting when the content is being captured comprises reading a portion of the content being captured into the user device and comparing the portion of the content with fingerprints indicative of known content.

3. The computer-implemented method of claim 1, wherein detecting when the content is being captured comprises monitoring the content for one or more watermarks embedded in the content.

4. The computer-implemented method of claim 3, wherein the existence of the one or more watermarks indicates that the content is protected content.

5. The computer-implemented method of claim 3, further comprising comparing the one or more watermarks with watermarks indicative of known content.

6. The computer-implemented method of claim 1, wherein altering the presentation of the content on the user device comprises presenting a notification on the user device that the content comprises protected content.

7. The computer-implemented method of claim 1, wherein altering the presentation of the content on the user device comprises ceasing the presentation of the content on the user device.

8. The computer-implemented method of claim 1, wherein altering the presentation of the content on the user device comprises automatically redirecting the user device to connect to a website or initiate an application for legitimizing the presentation of the content.

9. The computer-implemented method of claim 1, wherein altering the presentation of the content on the user device comprises presenting a notification on another user device to which the content is being broadcast that the content comprises protected content.

10. The computer-implemented method of claim 1, wherein altering the presentation of the content from the user device comprises ceasing the presentation on another user device to which the content is being broadcast.

11. The computer-implemented method of claim 1, wherein the at least one option comprises an option to have an ad-supported version of the content presented on the another user device, an option to buy the content, an option to rent the content, and an option to pre-order the content.

12. An apparatus, comprising:
   a processor;
   a memory having computer code being executed to cause the processor to:

identify content being captured via an input device implemented within the apparatus;

determine whether the content is protected content; and upon a determination that the content is protected content, altering the presentation of the content on the apparatus, wherein the altering of the presentation does not rely on a digital rights management technique associated with the content, wherein altering the presentation comprises presenting at least one option to legitimize the presentation of the content, the at least one option comprising an option to have an ad-supported version of the content presented on or from the user device, an option to rent the content, and an option to pre-order the content, and wherein altering the presentation of the content from the user device comprises presenting at least one option on another user device to which the content is being broadcast to legitimize the presentation of the content.

13. The apparatus of claim 12, wherein the computer code being executed to cause the processor to identify the content further causes the processor to monitor the content for a watermark and activation of the input device.

14. The apparatus of claim 13, wherein computer code further causes the processor to match the watermark with a known watermark indicative of known content.

15. The apparatus of claim 13, wherein the activation of the input device triggers an output pulse in response to which the computer code further causes the processor to read in at least one portion of the content for a comparison with fingerprints indicative of known content.

16. The apparatus of claim 12, wherein the computer code being executed to cause the processor to alter the presentation of the content further causes the processor to prohibit continued presentation of the content on the apparatus.

17. The apparatus of claim 12, wherein the computer code being executed to cause the processor to alter the presentation of the content further causes the processor to issue a protected content notification for presentation on at least one of the output device of the apparatus and at least one output device of a second apparatus that the content is broadcast to from the apparatus.

* * * * *